United States Patent
Cho et al.

(10) Patent No.: US 9,552,922 B2
(45) Date of Patent: Jan. 24, 2017

(54) FERRITE CORE STRUCTURE FOR A POWER SUPPLY DEVICE OF AN ELECTRIC VEHICLE AND POWER SUPPLY ROAD STRUCTURE USING SAME

(75) Inventors: Dong Ho Cho, Seoul (KR); Byung O. Kong, Busan (KR); Young Moo Shin, Daejeon (KR); Bo Yune Song, Seoul (KR); Sung Jun Son, Jeonju (KR); Jae Gue Shin, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 504 days.

(21) Appl. No.: 14/111,539

(22) PCT Filed: Apr. 13, 2012

(86) PCT No.: PCT/KR2012/002789
§ 371 (c)(1),
(2), (4) Date: Apr. 16, 2014

(87) PCT Pub. No.: WO2012/141512
PCT Pub. Date: Oct. 18, 2012

(65) Prior Publication Data
US 2014/0217829 A1    Aug. 7, 2014

(30) Foreign Application Priority Data
Apr. 13, 2011 (KR) .................. 10-2011-0034168

(51) Int. Cl.
B60L 11/18    (2006.01)
H01F 38/14    (2006.01)
(Continued)

(52) U.S. Cl.
CPC .............. *H01F 38/14* (2013.01); *B60L 11/182* (2013.01); *B60L 11/1837* (2013.01); *B60M 7/00* (2013.01);
(Continued)

(58) Field of Classification Search
CPC ................ H01F 3/04; H01F 3/14; H01F 3/00; H01F 7/0231; H01F 1/10; H01F 27/365; B60L 11/1837; B60L 11/182; B60M 7/00; Y02T 90/122; H02J 17/00; H02J 50/70; H02J 50/10
See application file for complete search history.

(56) References Cited

U.S. PATENT DOCUMENTS 7,804,272 B2 *   9/2010   Morita .................... B60L 5/005
                                                        320/108

FOREIGN PATENT DOCUMENTS

JP    2000-116035 A    4/2000
JP    2004-363137 A    12/2004
(Continued)

OTHER PUBLICATIONS

Covic et al., "A three-phase inductive power transfer system for roadway-powered vehicles", IEEE Transactions on Industrial Electronics, vol. 54, No. 6, Dec. 2007, pp. 3370-3378.*
(Continued)

*Primary Examiner* — Ryan Johnson
(74) *Attorney, Agent, or Firm* — Lex IP Meister, PLLC

(57) ABSTRACT

A ferrite core structure for a power supply device of an electric vehicle is disclosed. The ferrite core module improves output and limits a reduction in strength due to warpage in a traveling direction of the vehicle to prevent cracks generated in a surface of an intermediate portion of a power supply road from occurring. The ferrite core structure includes: a plurality of horizontal core parts arranged
(Continued)

Figure 1:
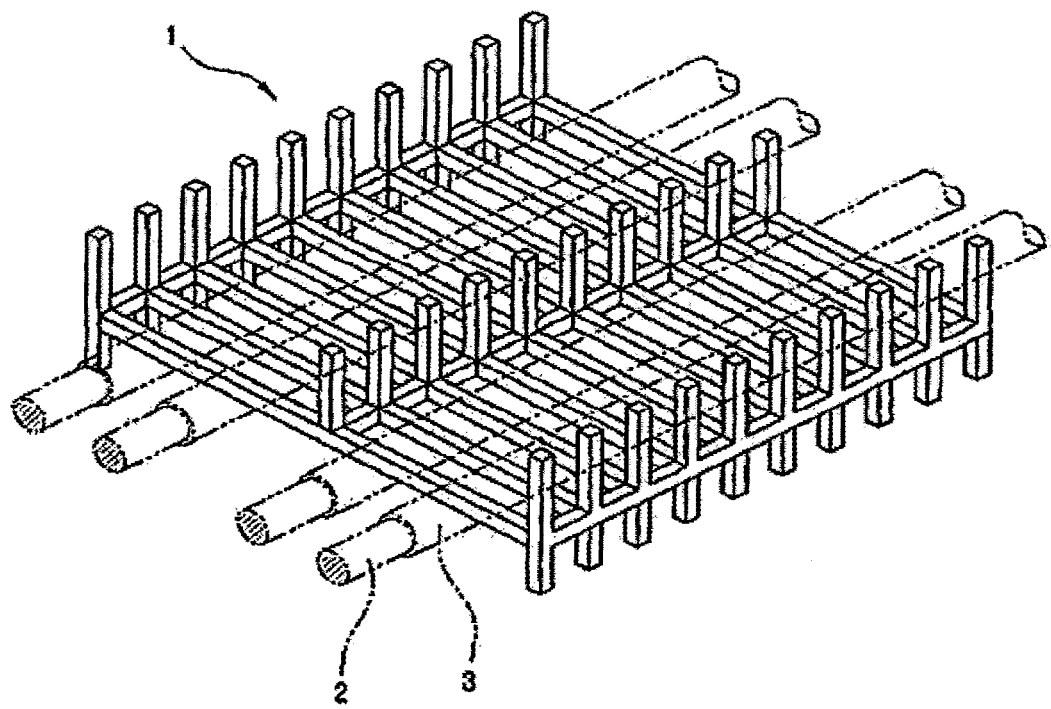
Figure 2:
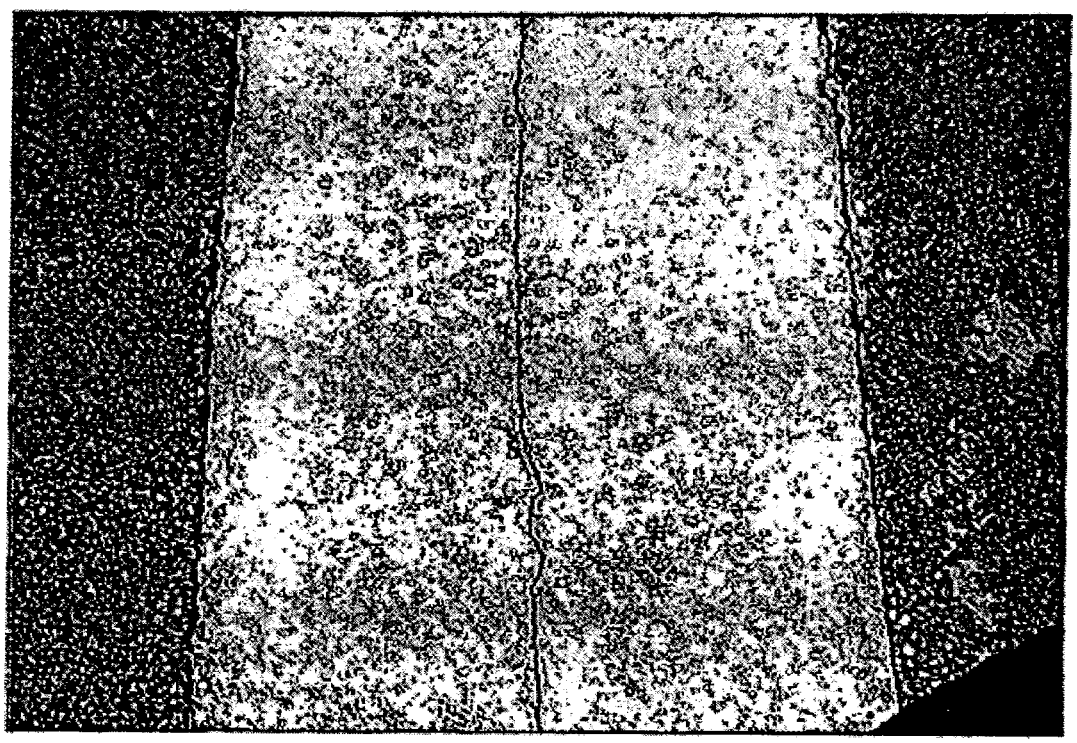
Figure 3:
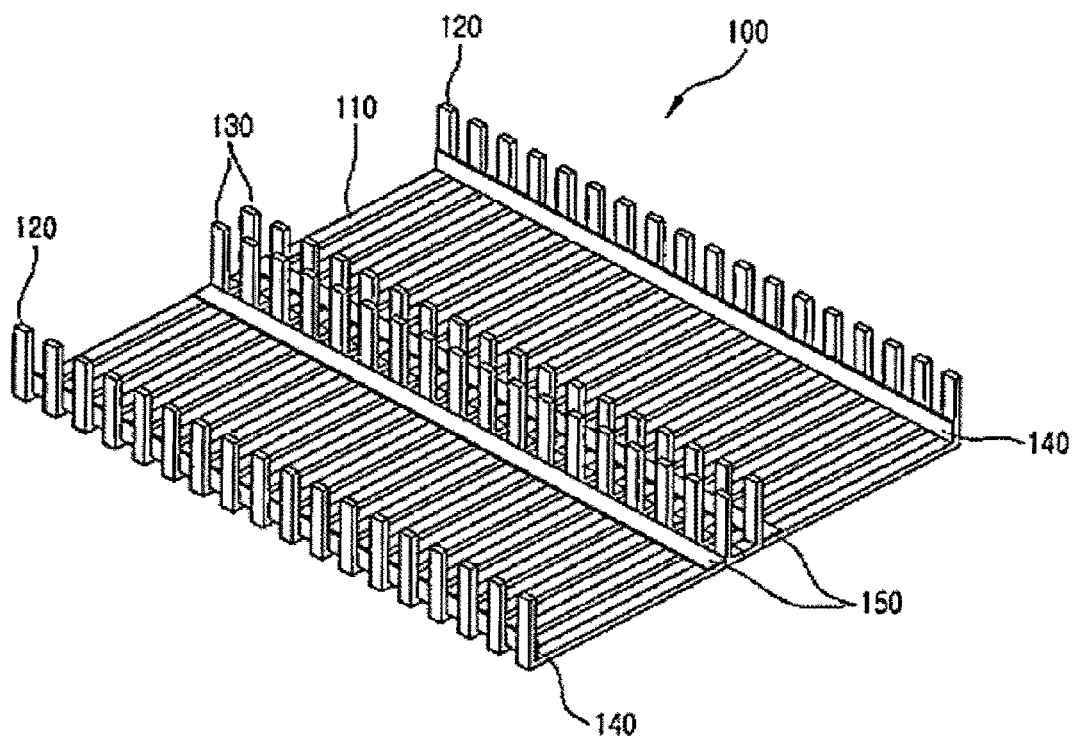
Figure 4:
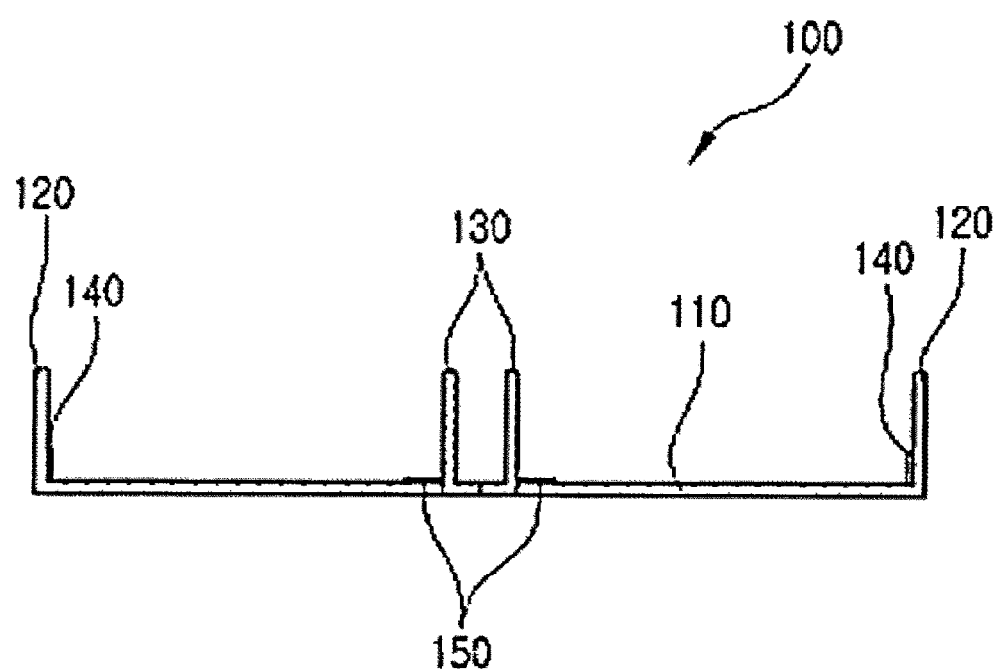
Figure 5:
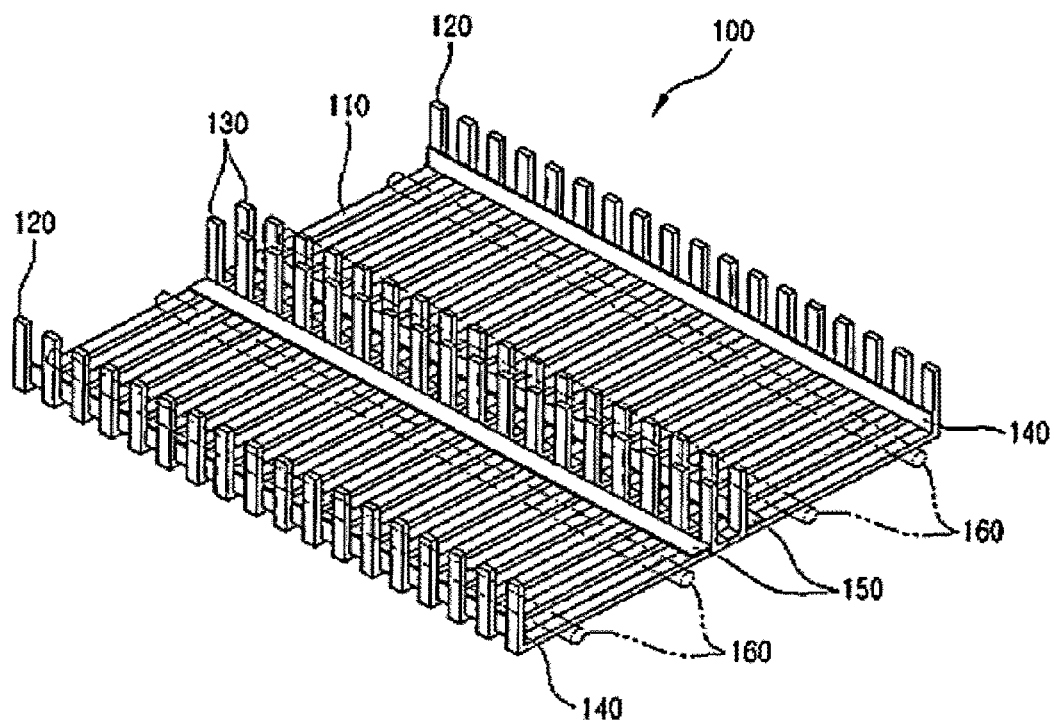
Figure 6:
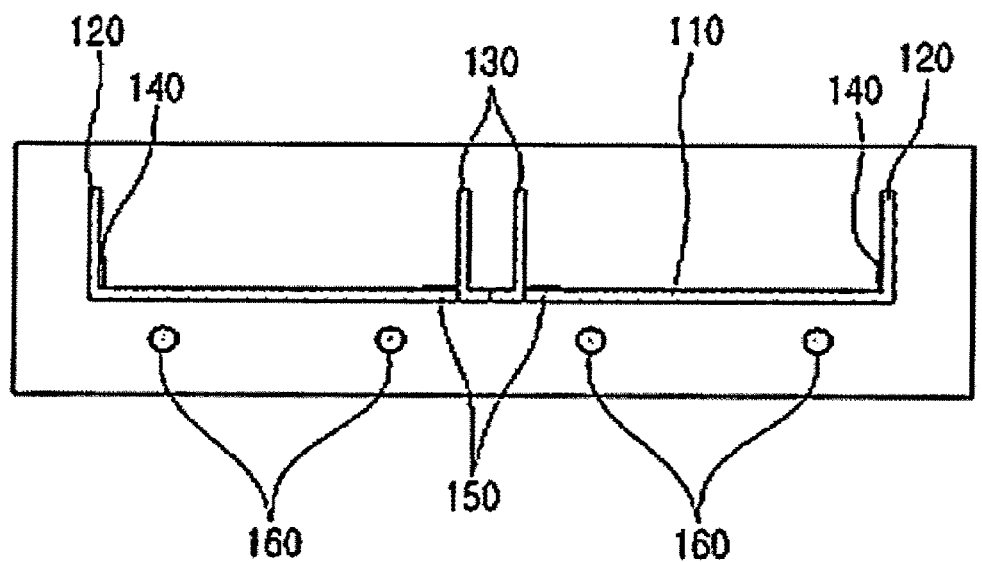

spaced apart from each other; a plurality of first vertical core parts extending upward from both ends of the horizontal core parts; a second vertical core part having at least two rows extending upward from an intermediate portion of each of the horizontal core parts. The second vertical core part is arranged parallel to the first vertical core parts. A first support part connecting the plurality of first vertical core parts to each other to support the first vertical core parts.

7 Claims, 3 Drawing Sheets

(51) Int. Cl.
    *H01F 3/04*     (2006.01)
    *H01F 1/10*     (2006.01)
    *B60M 7/00*     (2006.01)
    *H01F 3/00*     (2006.01)

(52) U.S. Cl.
    CPC   *H01F 1/10* (2013.01); *H01F 3/04* (2013.01); *H01F 3/00* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01)

(56) References Cited

FOREIGN PATENT DOCUMENTS

| | | | |
|---|---|---|---|
| JP | 2008-120239 A | 5/2008 | |
| KR | 2011072062 A * | 6/2011 | .............. B60L 11/18 |

OTHER PUBLICATIONS

Ahn et al., "Low frequency electromagnetic field reduction techniques for the on-line electric vehicle (OLEV)", Electromagnetic Compatibility (EMC), 2010 IEEE International Symposium on. IEEE, 2010, pp. 625-630.*
International Search Report for International Application No. PCT/KR2012/002789 dated Sep. 27, 2012.

* cited by examiner

FERRITE CORE STRUCTURE FOR A POWER SUPPLY DEVICE OF AN ELECTRIC VEHICLE AND POWER SUPPLY ROAD STRUCTURE USING SAME

TECHNICAL FIELD

The present invention relates to a ferrite core structure for a power supply device of an electric vehicle and power supply road using same. More particularly, the present invention relates to a ferrite core structure for a power supply device of an electric vehicle which changes the structure of a ferrite core structure according to a related art to prevent cracks generated in a surface of an intermediate portion of a power supply road from occurring and limit a reduction in strength due to warpage in a traveling direction of the vehicle with steel reinforcement in a power supply road in a traveling direction of the vehicle.

DESCRIPTION OF RELATED ART

An online electric vehicle is any motor vehicle that can be charged through non-contact electromagnetic field induced from power supply lines laid in the road while it stops or travels. The principles of a transistor holds for the power supply device of an electric vehicle with non-contact electromagnetic inductive charging, which converts the force of magnetic field generated from the power supply device laid in the road ("power supply rail") to electric energy.

Drawing 1 shows a general power supply rail which generates magnetic field for charging an electric vehicle with non-contact magnetic inductive charging. The power supply rail consists of a power supply line (2) which supplies electric energy and is surrounded with insulating duct (3) and a ferrite core module (1) which is installed in the lower part of the power supply line (2) to prevent the magnetic flux from occurring. The ferrite core module (1) is a structure which blocks magnetic flux in a leftward, rightward and downward direction and concentrates them in an upward direction.

Drawing 2 shows cracks generated in an intermediate portion of a conventional power supply road.

In the core of a conventional ferrite core module, there are vertical core parts (not shown) arranged in a line spaced from each other in a traveling direction. Problems have occurred that cracks were generated in a surface of an intermediate portion of a power supply road due to flexural loading on both sides of each of the vertical core parts.

Another problem of a conventional power supply road is that the road is subject to load repeatedly given by traveling vehicles and have cracks generated by a longitudinal deflection (a traveling direction).

Therefore, a need for a method which can prevent cracks generated in a surface of an intermediate portion of a power supply road and improve output more than that of a conventional ferrite core module comes to the fore.

In addition, a need for a method which can prevent cracks on a road by limiting a reduction in strength due to warpage in a traveling direction of the vehicle with repeated load due to traveling vehicles also arises.

DESCRIPTION OF THE INVENTION

Technical Task

The present invention was in response to the abovementioned needs. The first purpose of the present invention is to provide a ferrite core structure for a power supply device of an electric vehicle which changes the structure of a ferrite core module to prevent cracks generated in a surface of an intermediate portion of a power supply road and improve output more than that for a conventional ferrite core module.

The second purpose of the present invention is to provide a road structure using a ferrite core structure for a power supply device of an electric vehicle which can prevent cracks from occurring in a road by limiting a reduction in strength due to warpage in a traveling direction by load repeatedly applied to the road due to traveling vehicles.

Means to Solve the Task

The abovementioned purposes of the present invention can be accomplished by providing a ferrite core structure for a power supply unit of an electric vehicle, which includes multiple horizontal core parts arranged spaced apart from each other to prevent a magnetic flux from leaking into the ground, multiple first vertical core parts extending upward from both ends of the horizontal core parts to prevent the magnetic flux from leaking into an outer surface, a second vertical core part having at least two rows extending upward from an intermediate portion of each of the horizontal core parts and being arranged in a direction parallel to the first vertical core parts, and a first support part connecting multiple first vertical core parts to each other to support the first vertical parts.

And the horizontal core parts, the first vertical core parts, and the second vertical core parts are made of ferrite.

And each of the rows which form the second vertical core parts is arranged spaced apart from each other.

The ferrite core structure can have another second support part which connects multiple horizontal core parts to each other to support the horizontal core parts.

Meanwhile, the purpose of the present invention can be accomplished by providing a power supply road structure which includes said ferrite core structure for a power supply device of an electric vehicle, and at least one steel bar laid in the lower part of the ferrite core structure spaced from the ferrite core structure.

And the steel bars are laid in a longitudinal direction (a traveling direction) of a power supply road.

And the steel bars are more than 19 mm in diameter.

Effect of the Invention

According to an embodiment of the present invention, first, it has an effect of preventing cracks generated in a surface of an intermediate portion of a power supply road and improving output compared to that for a conventional ferrite core module by changing the structure of the ferrite core module.

Second, it has an effect of preventing cracks from occurring in a road by limiting a reduction in strength due to warpage in a traveling direction of the vehicle with load repeatedly applied to the road due to traveling vehicles.

BRIEF DESCRIPTION OF THE SEVERAL VIEW OF THE DRAWING

Drawing 1 is an oblique view of a general power supply rail which generates magnetic field for charging a conventional electric vehicle with non-contact magnetic inductive charging.

Drawing 2 is a figure showing that cracks are generated in an intermediate portion of a conventional power supply road.

Drawing 3 is an oblique view of a ferrite core structure for a power supply device of an electric vehicle according to an embodiment of the present invention.

Drawing 4 is a sectional view of a ferrite core structure (100) for a power supply device of an electric vehicle according to an embodiment of the present invention.

Drawing 5 is an oblique view of a ferrite core structure for a power supply device of an electric vehicle and steel bars laid in the ground according to an embodiment of the present invention.

Drawing 6 is a sectional view of a power supply road structure in which a ferrite core structure and steel bars laid according to an embodiment of the present invention.

THE BEST FORM FOR AN EMBODIMENT OF THE INVENTION

From now on, a desired embodiment of the present invention will be explained in detail on reference to the attached drawings. Note that the same components in the drawings are indicated by the same reference numbers and symbols as much as possible, although they are shown in different drawings. If a detailed explanation of related function or configuration is considered to unnecessarily obscure the gist of the present invention, such a detailed explanation will be omitted.

<Core Structure>

Drawing 3 is an oblique view of a ferrite core structure for a power supply device of an electric vehicle according to an embodiment of the present invention and Drawing 4 is a sectional view of a ferrite core structure (100) for a power supply device of an electric vehicle according to an embodiment of the present invention. As shown in Drawing 3 and Drawing 4, a ferrite core structure (100) (hereinafter referred to as the 'core structure') for a power supply device of an electric vehicle, the present invention, consists of horizontal core parts (110), the first vertical core parts (120), the second vertical core parts (130), and the first support parts (140).

The horizontal core parts (110) are arranged spaced apart from each other to prevent a magnetic flux from leaking into the ground. It is desirable that the spacing between the horizontal core parts (110) is smaller enough than the clearance between the surface of a power supply road and a current collecting module of the vehicle, for the spacing of the horizontal core parts (110) smaller enough than the clearance brings about little attenuation of magnetic field and has an effect as if the horizontal core parts (110) are sequentially arranged.

The first vertical core parts (120) extend upward from both ends of the horizontal core parts (110) to prevent a magnetic flux from leaking into the outer surface of the first vertical core part (120). That is, the horizontal core parts (110) and the first vertical core parts (120) prevent a magnetic flux from leaking in a downward and lateral direction of the core structure (110), so that a magnetic flux can concentrate in an upward direction of the core structure (100) and the strength of magnetic field can be maximized.

The second vertical core parts (130) extend upward from the intermediate portion of each of the horizontal core parts (110). Also the second vertical core parts (130) are arranged in a direction parallel to the first vertical core parts (120). They can have more than two rows but are desirable to have two rows. The second vertical core parts (130) disperse flexural loading upon both sides of the second vertical core parts (130) to prevent cracks from being generated in a surface of an intermediate portion of a power supply road. That is, the second vertical core parts (130) are configured as multiple rows at regular intervals so that the spacing between the rows of the second vertical core parts (130) can act as a buffer zone and prevent cracks from being generated in a surface of an intermediate part of a power supply road. Meanwhile, multiple second vertical core part (130) can be stuck on the horizontal core parts (110) with the glue and after each of the second vertical core parts (130) is constructed as an individual unit in the form of ' ⊂ ' and inserted into each of the horizontal core parts (110) which has an empty room for the individual unit to be inserted so that the opening part of the individual unit facing upward, the individual units can be stuck on the horizontal core parts with the glue. In addition, the horizontal core parts (110) may be assembled with the second vertical core parts in one unit.

In addition, the rows of the second vertical core parts (130) are arranged spaced apart from each other and the spacing of them may be ranged from 1 to 10 cm but 4 cm is desirable. If the spacing is too small or large, it is not possible to effectively disperse flexural loading upon both sides of the second vertical core parts (130). However, the spacing of the rows forming the second vertical core parts (130) can be adjusted variably according to the condition of the road.

In addition, the second vertical core parts (130) consisting of multiple rows have an effect of preventing a magnetic flux within the core structure (100) from leaking into an outer surface of the core structure (100). That is, by reinforcing the function to prevent a magnetic flux from leaking into an outer surface of the core structure (100), a magnetic flux can be more concentrated in an upward direction of the core structure (100).

In addition, the horizontal core parts (110), the first vertical core parts (120), and the second vertical core parts (130) are made of ferrite. Meanwhile, power supply lines (not shown) which forms magnetic field by supplying electric energy are installed in the spacing between the rows of the horizontal core parts (110), the first vertical core parts (120), and the second vertical core parts (130).

The first support parts (140) connect the first vertical core parts (120) to each other and support them. The first support parts (140) can be formed along the inner and outer surfaces of the ends of the first vertical core parts (120) or installed in not the ends but the middle sections of the first vertical core parts (120). In addition, the first support parts (140) may be made of ferrite or other materials such as iron or alloy. Meanwhile, the first support parts (140) can be stuck on the first vertical core parts with the glue.

In addition, the core structure (100) can include the second support parts (150) which connect multiple horizontal core parts (110) to each other to support the horizontal core parts (110). A detailed explanation of the second support parts (150) is omitted because it overlaps with that of the first support parts (140).

<Road Structure>

Drawing 5 is an oblique view of a ferrite core structure for a power supply device of an electric vehicle and steel bars laid in the ground according to an embodiment of the present invention and Drawing 6 is a sectional view of a power supply road structure in which a ferrite core structure and steel bars laid according to an embodiment of the present invention. As shown in Drawing 5 and Drawing 6, the structure of a power supply road in which the core structure (100) and the steel bars (160) are laid (hereinafter referred to as the 'road structure') consist of the core structure (100) which includes the horizontal core parts (110), the first vertical core parts (120), the second vertical core parts (130), the first support parts (140), and the second support parts (150) and the steel bars (160) laid in the lower part of the core structure (100) spaced apart from the core structure (100). Meanwhile, an alternative of the road structure can consist of the core structure (100) which includes the horizontal core parts (110), the first vertical core parts (120), the second vertical core parts (130) and the first support parts (140) and steel bars (160) (not shown). Only the steel bars (160) will be explained in the following, for the explanation of the core structure (100) has already been given.

The steel bars (160) are laid in a longitudinal direction (traveling direction) of a power supply road. The number of the steel bars (160) is one or more and can be adjusted according to the condition of a power supply road. In addition, if the diameter of the steel bars (160) in use is small, the number of the steel bars (160) laid in the road can be increased; if the diameter of the steel bars (160) in use is large, the number of the steel bars (160) laid in the road can be decreased. Drawing 6 shows the state that four steel bars (160) are laid in the road, as an example.

It is desirable to use the steel bars (160) more than 19 mm in diameter, for the steel bars (160) less than 19 mm in diameter cannot effectively limit a reduction in strength due to warpage in a traveling direction with load repeatedly applied to the road due to traveling vehicles. That is, the steel bars (160) less than 19 mm in diameter cannot withstand load applied to the road but warp in a traveling direction of the vehicle, failing to prevent cracks from being generated on the road.

The test results for output (kw) and EMF (mG) measured using the core structure (100) according to an embodiment of the present invention are described below. [Table 1] lists the measurements for a conventional ferrite core module and [Table 2] lists the measurements for the core structure (100) which have the second vertical core parts (130) arranged spaced apart from each other at 4 cm intervals according to an embodiment of the present invention.

Test Conditions

In the present test, output and EMF were measured with the following test conditions: 94 (A) and 130 (A) of power supply current were used. EMF (Electro-Magnetic Field) was measured 1.2 m distanced from the center of a current collector. The clearance between the surface of a road and the current collecting module of a vehicle was set to 25 cm.

Test Results

As indicated in [Table 1] and [Table 2] below, a core structure which has the second vertical core parts with changed structure like the present invention has improved output and EMF compared to a conventional ferrite core module. In particular, the magnitude of EMF has been improved compared to a conventional ferrite core module when the amplitude of power supply current in use was 130 (A) rather than 94 (A).

TABLE 1

| Power Supply Current (A) | Resonant Frequency (kHz) | Voltage (V) | Current (A) | Output (kw) | EMF@1 (mG) | EMF@2 (mG) |
| --- | --- | --- | --- | --- | --- | --- |
| 94 | 20 | 229 | 37.4 | 8.564 | 273 | 171 |
| — | 19.97 | 239 | 38.8 | 9.273 | 217 | 195 |
| — | 19.92 | 246 | 39.7 | 9.766 | 267 | 209 |
| 130 | 19.92 | 335 | 53.6 | 17.956 | 361 | 282 |
| — | 19.9 | 338 | 53.5 | 18.083 | 368 | 288 |

TABLE 2

| Power Supply Current (A) | Resonant Frequency (kHz) | Voltage (V) | Current (A) | Output (kw) | EMF@1 (mG) | EMF@2 (mG) |
| --- | --- | --- | --- | --- | --- | --- |
| 94 | 20 | 234 | 38.2 | 8.938 | 280 | 326 |
| — | 19.95 | 247 | 40 | 9.88 | 297 | 345 |
| 130 | 19.95 | 333 | 53 | 17.649 | 401 | 465 |
| — | 19.91 | 341 | 53.8 | 18.345 | 409 | 473 |

This concludes discussion of the technical philosophy for the present invention with the attached drawings. The discussion has been provided for the best embodiment of the present invention as an example but not limits the present invention. It is also an obvious fact that anyone who has common knowledge of the related art of the present invention can alter and imitate the present invention in various ways within a range not deviating from the category of the technical philosophy of the present invention.

What is claimed is:

1. A ferrite core structure for a power supply device of an electric vehicle which includes multiple horizontal core parts arranged spaced apart from each other to prevent a magnetic flux from leaking into the ground, multiple first vertical core parts extending from both ends of said horizontal core parts upward to prevent a magnetic flux from leaking into an outer surface, a second vertical core part having at least two rows extending upward from an intermediate portion of each of said horizontal core parts and being arranged in a direction parallel to said first vertical core parts, and a first support part connecting said multiple first vertical core parts to each other to support said first vertical core parts, provided that said second vertical core parts disperse flexural loading upon both sides of said second vertical core parts to prevent cracks from being generated in a surface of an intermediate portion of a power supply road.

2. The ferrite core structure for a power supply device of an electric vehicle of claim 1, wherein said horizontal core parts, said first vertical core parts and said second vertical core parts are made of ferrite.

3. The ferrite core structure for a power supply device of an electric vehicle of claim 1, wherein each of the rows forming said second vertical core parts are arranged spaced apart from each other.

4. The ferrite core structure for a power supply device of an electric vehicle of claim 1, wherein a second support part connecting said multiple horizontal core parts to each other to support said horizontal core parts is included.

5. A power supply road structure which includes the ferrite core structure for a power supply device of an electric vehicle of claim 1 and at least one steel bar laid in a lower part of said ferrite core structure spaced apart from said ferrite core structure.

6. The power supply road structure of claim 5, wherein said steel bar is laid in a longitudinal direction representing a traveling direction of the vehicle.

7. The power supply road structure of claim 5, wherein said steel bar is more than 19 mm in diameter.

\* \* \* \* \*